INVENTOR
CLYDE R. HEMBREE

BY Julian C. Renfro
ATTORNEY

TARGET AT REMEMORIZATION

TARGET AT 40% CLOSURE

United States Patent Office 3,416,752
Patented Dec. 17, 1968

1 2

3,416,752
CORRELATION GUIDANCE SYSTEM HAVING MULTIPLE SWITCHABLE FIELD OF VIEW

Clyde R. Hembree, Orlando, Fla., assignor to Martin-Marietta Corporation, New York, N.Y., a corporation of Maryland Filed Mar. 23, 1966, Ser. No. 536,834
10 Claims. (Cl. 244—3.17)

ABSTRACT OF THE DISCLOSURE

This invention relates to an optical system having a multiple field of view capability comprising a set of optical lenses, with lenses of at least two different focal lengths being employed, and with means being provided for switching one of such lenses at a time into an operative position. In this manner, various optical indications of a target area can be selectively provided. Means are also provided for generating a signal proportional to a predetermined amount of change in the appearance of the target as perceived through a lens, with a connection being provided to the switching means to accomplish a switching of lenses at a time in which the characteristics of the signal have changed to a certain value. As will be understood, my system provides an effective means for counteracting the effects of range closure on the accuracy of a correlation guidance system.

The present invention relates to a missile tracking system or the like, and more particularly to such a system including an optical portion providing multiple switchable fields of view and a novel electronic portion for use therewith to control switching between field of view during range closure between the missile and the target.

In the general type of tracking system with which the invention per se is used, there is provided means to scan the target area and to develop a contrast pattern uniquely characterizing the target. The system includes a memory to store a reference contrast pattern and means to periodically update the stored pattern as closure is effected between the tracking system and the target.

An initial contrast pattern is stored at some predetermined point in the flight, by operation of the scanner included in the tracking system (or by pre-storing data produced by another scanner). At a succession of times during range closure, the memorized contrast pattern is updated by operation of the scanner. Between updatings of the memory, the scanner operates to provide a live contrast pattern of the area within the field of view of the tracker at that time. The memorized and live patterns are compared, and correlation signals produced from which are derived control signals for use by the tracker.

As the result of the circular scanning arrangement, the contrast pattern generated thereby comprises a continuous (or appropriately digitized) signal representative of the target contrast as a function of the angle of rotation of the scanning element. The memory system is preferably a rotating disc operating synchronously with the scanning means, or any other suitable arrangement whereby the information stored therein is representative of the contrast pattern as a function is the scanner angle. The live and memorized patterns are correlated to provide information representative of the amount of angular misalignment between the two patterns. This information is further processed and roll, pitch, and yaw control signals are generated for modifying the orientation of the optical axis of the tracker to minimize the angular misalignment between the current and memorized contrast patterns.

The tracking system may be rigidly attached to the missile, in which case variations in tracker orientation are achieved by actually changing the angular attitude of the missile or by translation of the missile due to maneuvering commands. Preferably, however, the tracker is electronically or mechanically gimballed within the missile to decouple the tracker from missile attitude motion. This permits three angular degrees of freedom for the optical axis thereof. Under such circumstances, the roll, pitch and yaw signals referred to above serve only to re-orient the tracker axis. Suitable sensors associated with the tracker serve to detect changes in tracker orientation, and to initiate changes in the missile's course to realign it with the tracker. A system such as described above is shown in assignee's copending United States patent application, Ser. No. 525,090, filed Feb. 4, 1965, now Patent No. 3,372,890, by J. R. Bogard et al., entitled "Data Processor for Circular Scanning Tracking System," identified below as Bogard (I) and is the subject of assignee's further copending United States patent application, Ser. No. 627,393, filed Mar. 31, 1967, by J. R. Bogard et al., entitled: "Image Motion Compensation System," identified below as Bogard (II).

The Bogard (I) application is primarily concerned with a novel closed loop data processor for a circular scanning tracking system by which the correlation information may be converted into roll, pitch, and yaw control signals. The present invention, is directed to an independent, though complementary sub-system by which there is provided information in the system memory at the appropriate times in order to prevent the build-up of errors which result due to the range closure between the target and the missile.

As described in detail below, the correlation of the reference contrast pattern and the currently acquired pattern is directly affected by the fact that the distance between the missile and the target is constantly decreasing until missile impact. A first effect on such range closure is that of "object blow-up." As the missile approaches the target, all of the objects within the field of view of the scanner appear to be increasing in size. Thus, the target scene changes because portions of the originally memorized pattern disappear radially from the field of view and other portions enter the field of view or otherwise become re-oriented as the target approaches the missile. Because the live and stored scenes actually are different, the aiming point will shift as the tracker correlation system compares the two scenes.

The second range closure phenomenon might be termed "horizon effect." For purposes of description, the area observed by the scanner field of view could be composed of both sky and ground surfaces, two contrastive regions separated by the horizon. As the missile approaches the target, the intersections of the scanner field of view and the horizon do not appear at a constant angular position in the scan. Thus, the correlation between the stored and the current data will be such that the system will attempt to reorient the tracker to maintain the original angular relationship with the horizon. This causes the original aim point to shift due to the interaction between live and stored horizons during range closure. Thus this represents an additional error caused by range closure. In an attempt to correct such apparent though false errors, the orientation of the tracker axis is directed further and further away from the actually desired orientation. Eventually, the target (original aim point) completely disappears from the optical field of view if means are not provided to counter the effects of range closure. Roads, land to water boundaries and, in fact, all major contrasting regions also yield the "horizon effect" to a greater or lesser extent affecting accuracy.

Prior to this invention, several techniques have been proposed to compensate the errors accruing from range closure effects. One such technique is to include means within the system to periodically re-memorize the target scene. This approach is often used, however, it alone cannot correct the tracking error due to the horizon effect, and as to blow-up effects, can only limit the extent and/or the rate at which such error is permitted to grow. As may be understood, each rememorization of the target scene results in the insertion into the memory of target source intelligence correlative to the target scene actually viewed by the tracker at the time of rememorization. Thus, any errors present in the orientation at such time e.g. due to angular misalignment, servo noise, etc., are included in each new reference target pattern. The accumulation of such errors through successive rememorizations, may under certain circumstances lower the system's overall tracking accuracy to the extent that its effectiveness is decreased, for example, in an attack on a "hard" target where a direct hit is essential.

Alternatively, because an optical system having a given field of view will scan continuously decreasing areas as the distance between the missile and the target is decreased, and, in effect magnify the image more and more, causing the accrual of drift errors due to the horizon effect, it has been proposed that the range closure effects described above could be compensated for by increasing the field of view of the optical system during range closure. One approach of this type would involve the use of a mechanical zoom lens in the optical portion of the tracker. While such an obvious arrangement has been used, it has proven to be undesirable because of the complexity of the required mechanical systems, because of the low speeds of response thereof, and because of the tendency for the optical boresight of zoom lens of this type to "helix" and to exhibit other mechanical tolerance limitations as the missile approaches the target. A further disadvantage is that the optical "gain" of the system is steadily decreased, thereby lowering accuracy.

In contrast to the above, the system of the present invention substantially overcomes the difficulties of previously used variable field of view optical systems, and provides a means whereby the effects of range closure on the accuracy of the correlation guidance system may be substantially eliminated. The present invention, is adapted for use in an optical correlation guidance system such as shown in the above-mentioned Bogard et al. applications [(I) and (II)], and comprises a pair of fixed focal length lenses so positioned that the optical axes thereof are substantially coincident. The two lenses are of unequal focal lengths and are provided with means to selectively block the impingement of light from one of the lenses on a common focal point. The system may be followed by a suitable photodetector, a circular scanning disc, an analog to digital converter, memory means, and means to correlate current target data with information stored in the memory, such as in the Bogard et al. applications.

The present invention further includes appropriate logic circuitry adapted to operate in accordance with the principles disclosed herein to select the appropriate one of the two lenses for use at a given time, and determine when and which of the lenses shall provide the image to be stored in the memory means at such times as updating thereof is necessary. In one embodiment, there is provided an arrangement to alternate the lenses, using a memory channel included in the overall systems. [See Bogard (I) and (II).]

In a second embodiment, there are provided two separate memory channels, and two separate correlators, whereby contrast information provided by each lens is stored in an appropriate memory and separately correlated with currently acquired contrast data. In accordance with the degree of correlation produced by each lens, the appropriate lens is selected to provide the currently acquired information.

The provision of multiple switchable fields of view greatly improves the accuracy of correlation, and provides means to prevent the accumulation of drift errors caused by "horizon effect" shift during range closure. The present invention is superior to systems incorporating mechanical zoom lenses, both as a result of decreased complexity, increased speed of response, and also due to improved accuracy associated with the ease of boresight alignment of the two fixed optical elements.

Accordingly, it is an object of this invention to provide improvements in optical correlation guidance systems.

It is a further object of this invention to provide a correlation guidance system employing an optical subsystem having multiple switchable fields of view.

It is a related object of this invention to provide electronic switching logic to select one of the multiple fields of view and for controlling the memorization of data in the system.

It is an additional object of this invention to provide an optical correlation guidance system wherein the effects on the accuracy thereof of range closure are substantially eliminated.

It is an additional object of this invention to provide in a correlation guidance system on optical sub-system employing multiple switchable fields of view, which prevents the accumulation of errors due to successive rememorizations of a target pattern during range closure.

It is further an object of this invention to provide in a correlation guidance system, a plurality of separate optical elements selectively employed to produce images both for storage and current correlation, and having provision for selectively choosing the appropriate optical element in accordance with the degree of correlation between the current and stored target contrast patterns.

It is a further object of this invention to provide in a correlation guidance system having a variable field of view an optical sub-system characterized by heretofore unavailable simplicity, accuracy and reliability.

The exact nature of this invention, as well as other objects and advantages thereof, will be clear from consideration of the following detailed description, and the accompanying drawings, of which:

Figure 1:
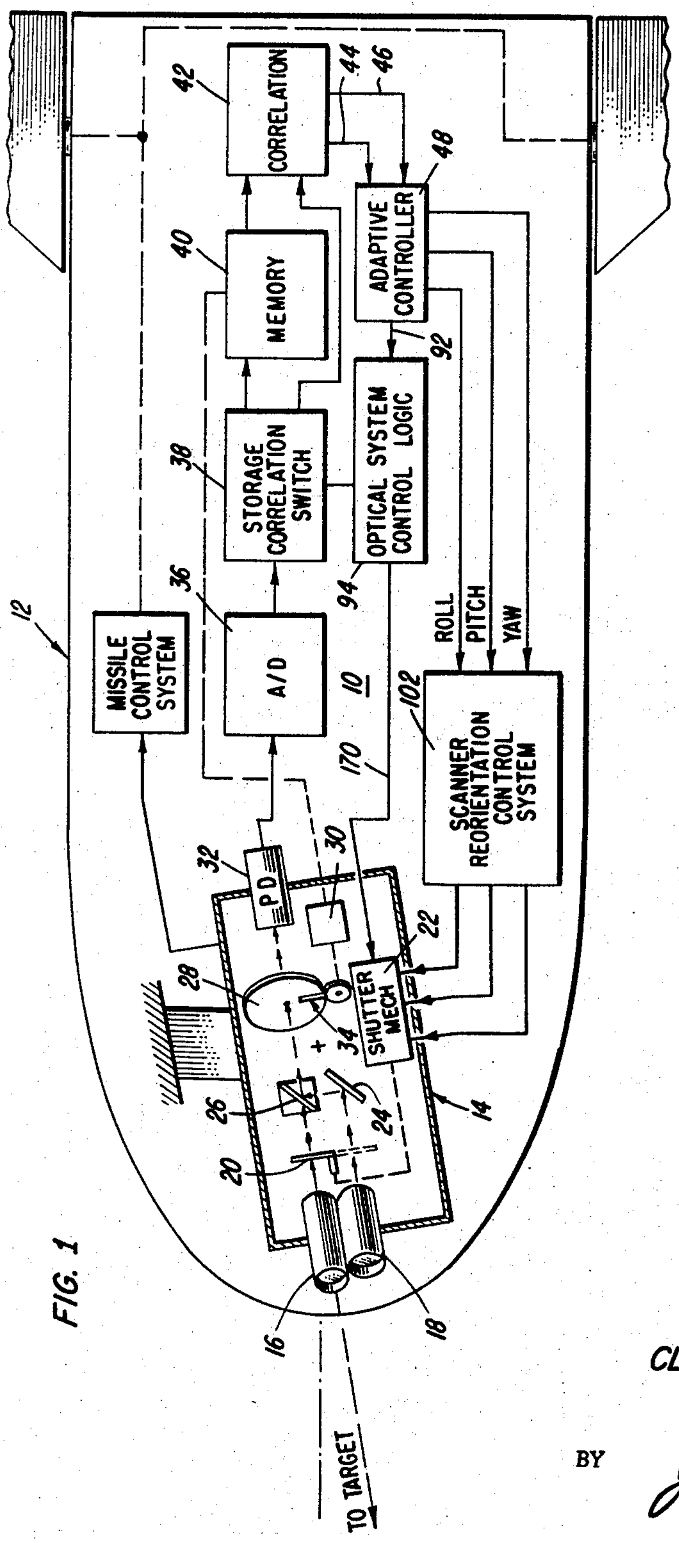
FIGURE 1 is a diagram depicting the overall features of the correlation guidance system to which the present invention pertains.
Figure 8A:
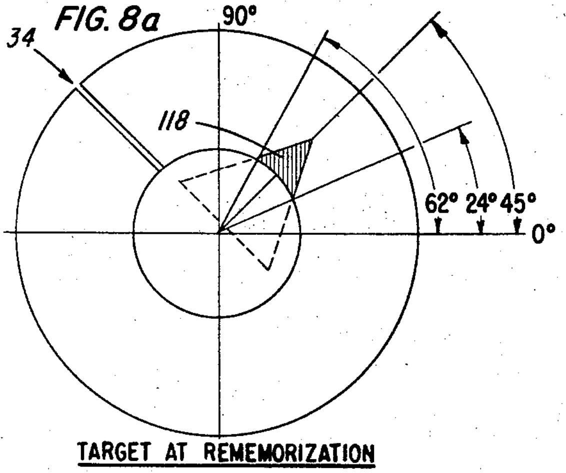
Figure 8C:
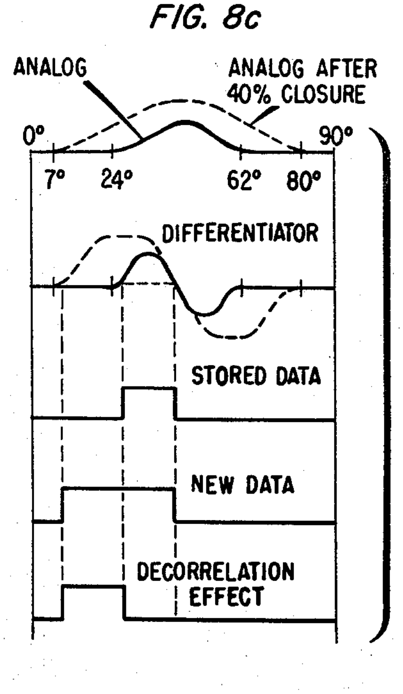
Figures 8B, 10:
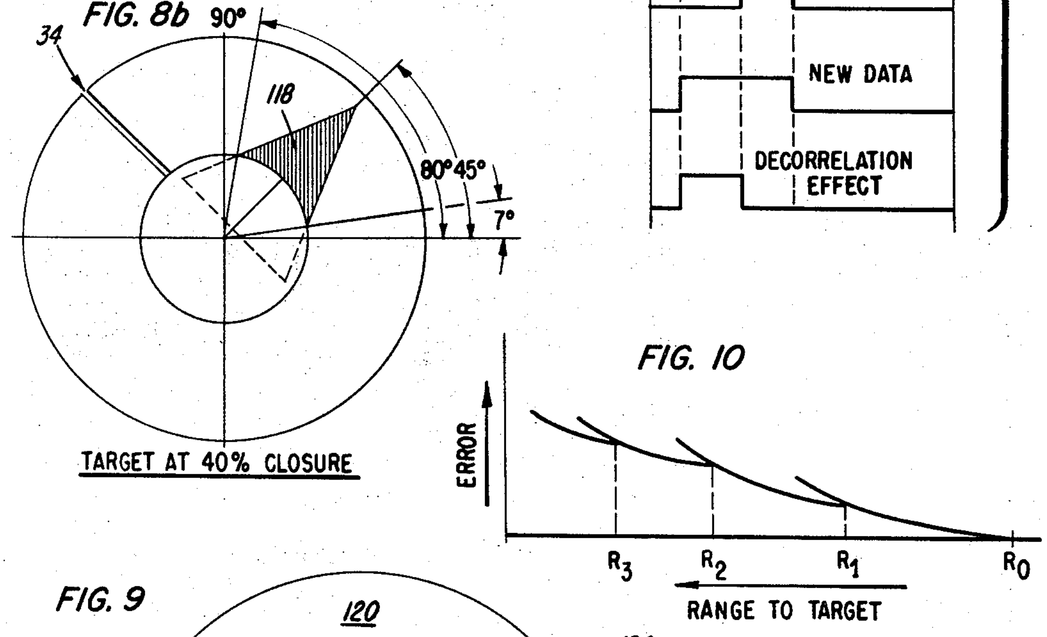
Figure 9:
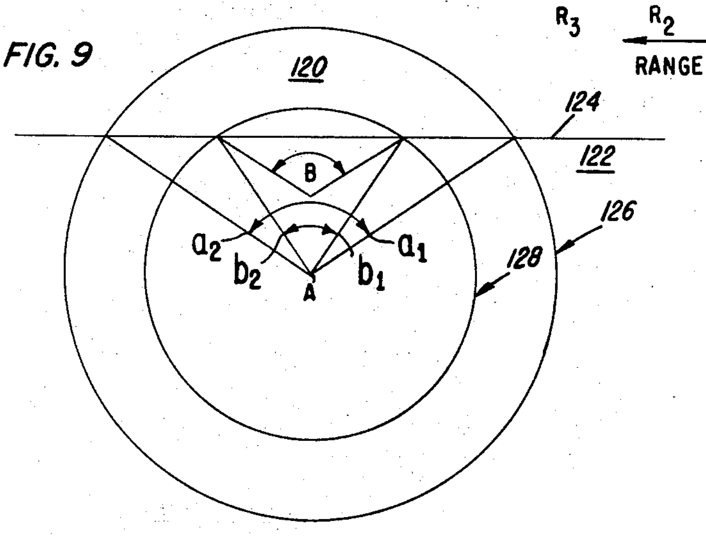
Figure 12:
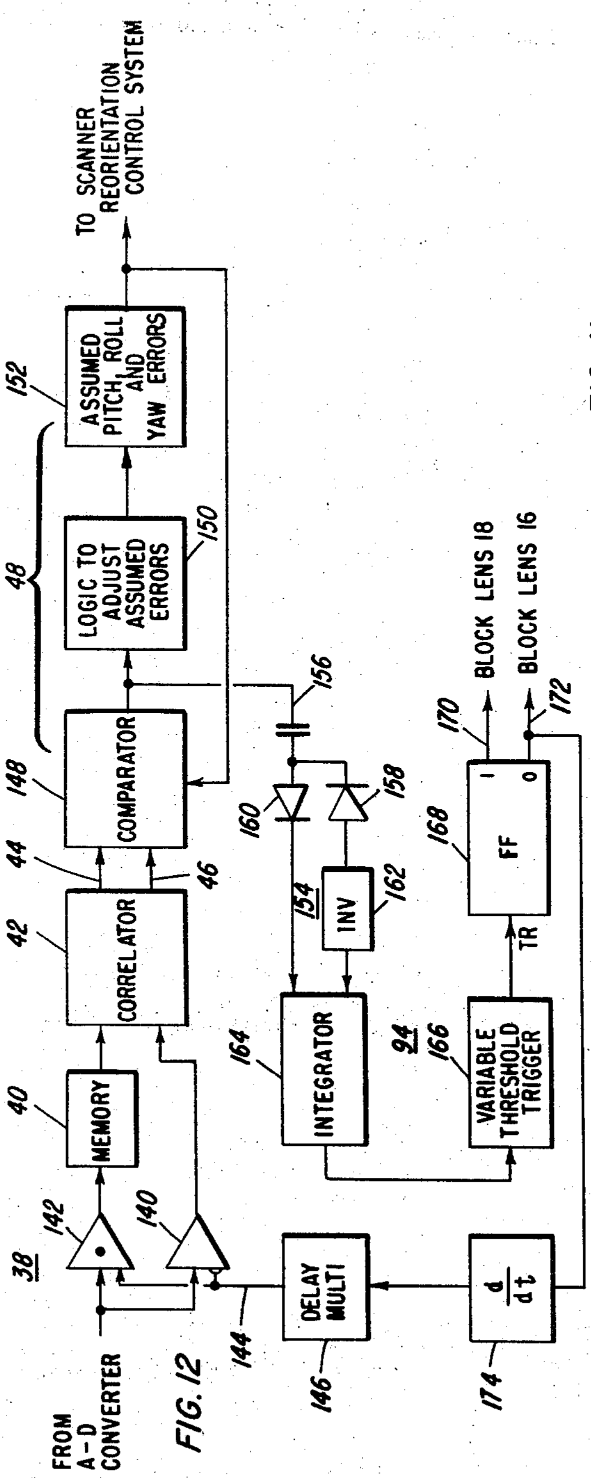
Figure 11:
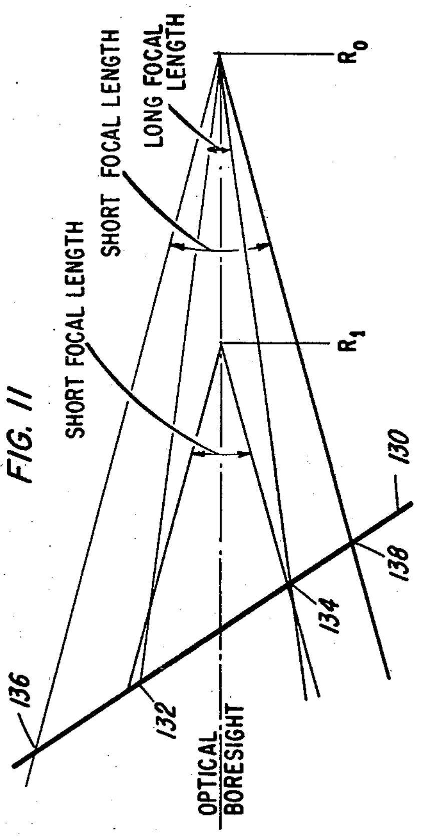
Figure 14:
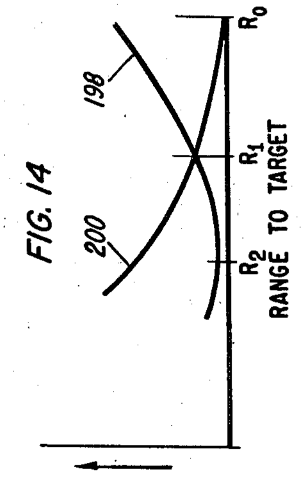
Figure 13:
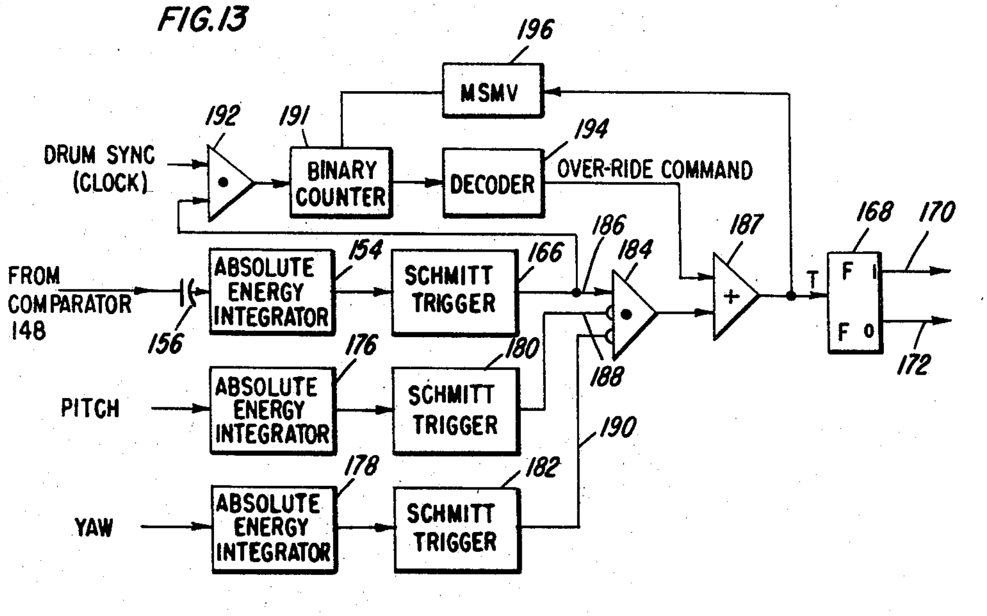
Figure 15:
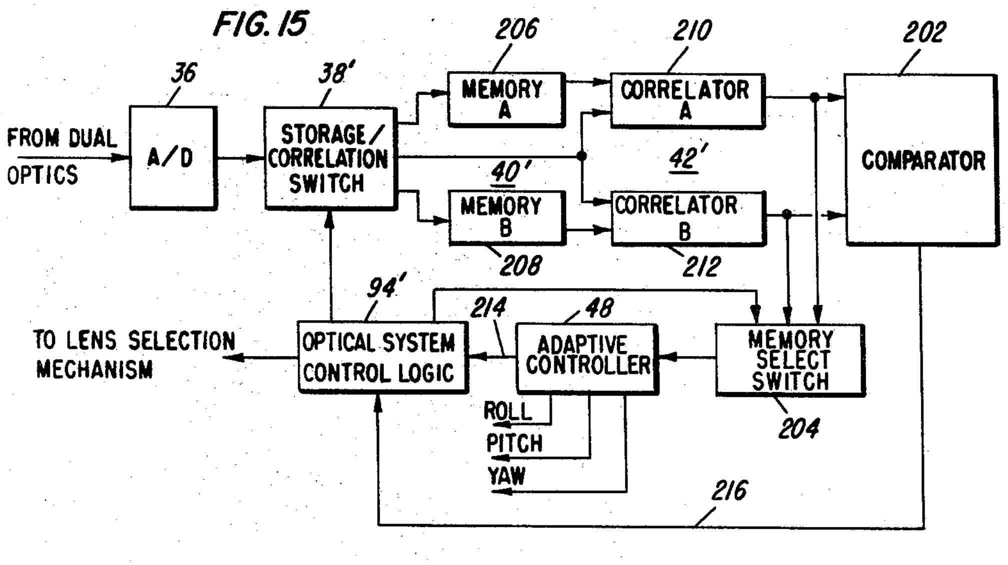

FIGURES 7*a*, 7*b* and 7*c*, and 8*a*, 8*b* and 8*c*, show the effect of "blow-up" due to range closure on the target image;

FIGURE 9 shows the "horizon effect" on the target image;

FIGURE 10 is a diagram showing the cumulative effects of errors present at each rememorization in a single field of view system;

FIGURE 11 is a diagram showing the manner in which multiple field of view optics may be used to correct the accumulation of errors shown in FIGURE 10;

FIGURE 12 is a block diagram showing a simplified version of a portion of the system of FIGURE 1 whereby switching of fields of view is accomplished;

FIGURE 13 is a block diagram showing a practical embodiment of the switching logic shown in a portion of the system of FIGURE 12;

FIGURE 14 shows the manner in which multiple field of view optics may be alternatively employed with overlapping regions of pattern correlation; and FIGURE 15 is a block diagram of a modification of the construction of FIGURES 12 and 13 which may be used as described in connection with FIGURE 14.

Referring now to FIGURE 1, the tracking system to which the present invention pertains, generally denoted at 10, comprises the guidance system of a missile 12. The tracker includes a circular scanner 14, suitably mounted in the forward portion of tthe missile. Scanner 14 includes a pair of optical assemblies 16 and 18 of different focal length, a pivotally mounted shutter 20 and a coupled operating mechanism 22. A fully reflective mirror 24 is arranged to reflect the light passing through optics 16 into the plane of a second partially transmitting mirror 26. Light from optics 18 strikes the opposite surface of mirror 26 and a portion thereof is transmitted. Optical assemblies 16 and 18 and mirrors 24 and 26 are rigidly attached, and so positioned with respect to each other that the optical axes thereof are effectively aligned with the optical boresight of the tracker. (The small displacement between the axes of optical assemblies 16 and 18—e.g., a few inches—may be disregarded in view of the dimensions and distances associated with typical missile targets.)

Shutter 20 is arranged to completely block the light from one or the other of the optics depending upon its instantaneous position. For example, in the position shown, light is permitted to pass through optics 18 while optics 16 is blocked. When the shutter is reversed (shown in outline) optics 18 is blocked. The optical alignment of the system is not in any way disturbed by shutter 20.

Scanner 14 further includes an opaque disc 28, a motor 30 to rotate disc 28, and a photodetector 32. Disc 28 includes a narrow, generally radial slit 34, by which small portions of the field of view of the scanner may be viewed in succession. Motor 30 may be adapted to rotate disc 28 by means of the gearing arrangement shown schematically in the figure, or in any other suitable manner. The output of photodetector 32 is connected to an analog to digital converter 36, described in detail below.

The output of converter 36 is connected to a storage correlation switch 38 which operates as described below selectively to provide inputs to memory system 40 and to a correlator 42. The correlator 42 processes the live and reference contrast patterns to provide a pair of output signals on leads 44 and 46, representative of the angular misalignment between the memorized and current contrast patterns to an adaptive controller 48, a data processing portion of which generates roll, pitch and yaw correction signals based on the angular misalignment measured by correlator 42.

Figures 2, 3:
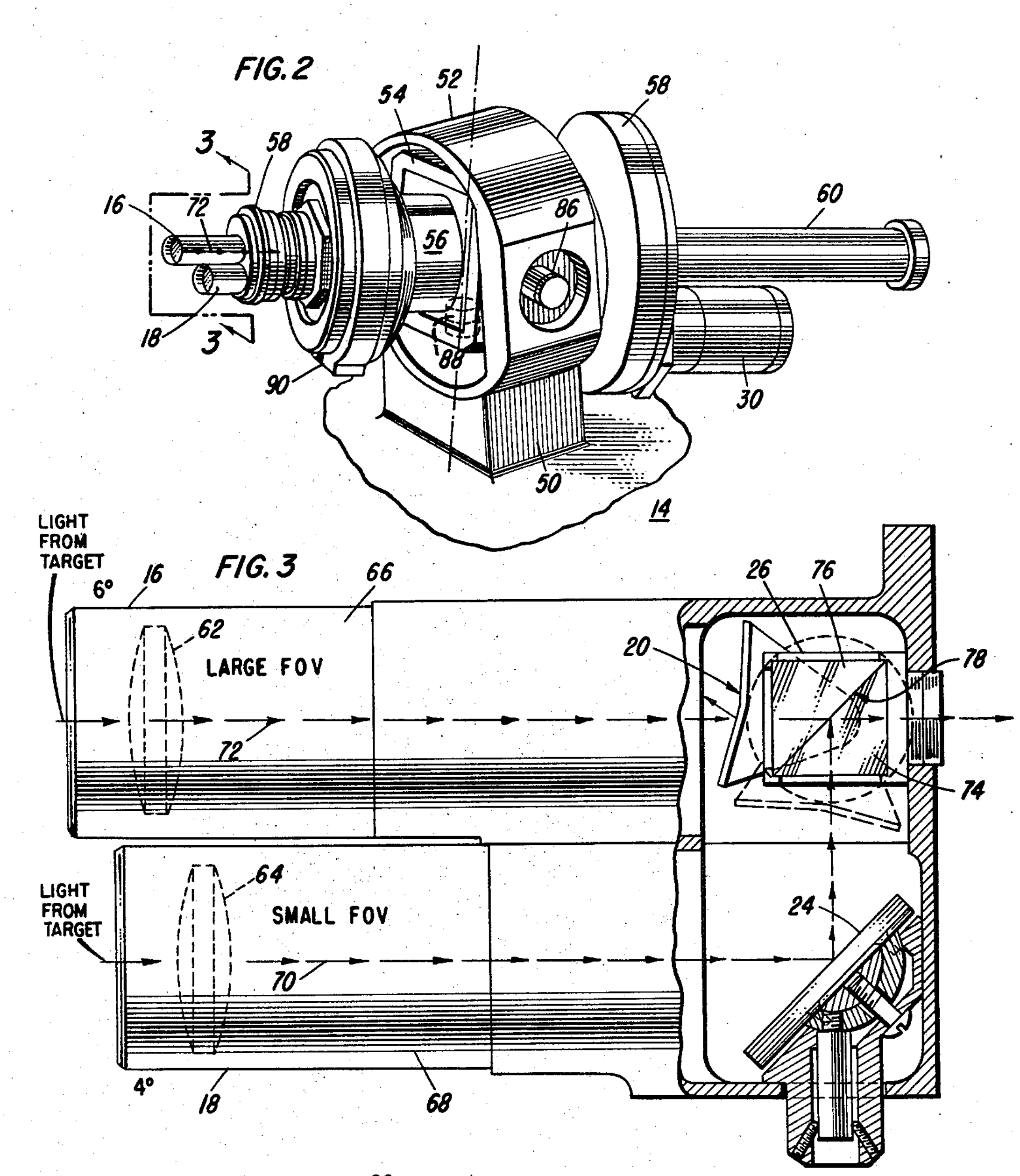
FIGURE 2 is a detailed view of a portion of FIGURE 1 showing the construction of a particular type of tracker including the optical sub-system having multiple switchable fields of view and the associated switching logic.
FIGURE 3 is a fragmentary sectional view taken along line 3—3 in FIGURE 2 showing in detail the construction of the optical sub-system in accordance with this invention.

In FIGURE 2, there is shown the construction of an appropriate mounting arrangement for scanner 14. The construction of FIGURE 2 is described in detail in the aforementioned Bogard et al. application (I), as well as the reasons for the use of a construction of this type. Briefly, however, the mechanism of FIGURE 2 comprises a three degree of freedom gimballing system, including a base portion 50, an outer ring 52, a pivotally mounted inner ring 54, and a rotatably mounted tubular member 56 within ring 54. At the forward end of tube 56 is positioned a suitable housing 58 in which are rigidly mounted optical assemblies.

At the opposite end of tubular member 56, there is provided housing 58 which encloses the rotatable magnetic disc memory 40 noted in FIGURE 1. Motor 30 is mounted on housing 58 to permit rotation of both the memory disc or drum in memory 40 and scanning disc 28 which may be conveniently positioned in a common shaft, with scanning disc 28 located at the forward end of the common shaft in the image plane of optics 16 and 18. Housing 58 includes a closed chamber 60 wherein is positioned photodetector tube 32.

The details of the optical portion of the present invention are shown in FIGURE 3 which also shows, in longitudinal cross section, the manner in which optics 16 and 18 may be attached to tubular member 56 of FIGURE 2. As may be seen, optics 16 and 18 include appropriate lenses 62 and 64, and barrels 66 and 68, respectively. As indicated, optics 16 and 18 are of differing focal lengths. For example, as shown, lens 64 is of greater focal length than lens 62, due to the folded light path for lens 64.

A first surface mirror 24 positioned along the optical axis 70 of lens 18 is arranged at a 45 degree angle whereby light passing through the lens is reflected at a right angle toward the optical axis 72 of lens 62. Positioned in the path of the so reflected light beam is a second mirror 26 comprising a pair of triangular prisms 74 and 76 having the interface 78 therebetween positioned parallel to the face of mirror 24. Thus, light reflected from mirror 24 passes through prism 76 and strikes interface 78 where a portion thereof is again reflected at a right angle, and is directed on along the optical axis 72 of lens 62.

Light passing directly through lens 62 enters prism 74, and a portion thereof, upon striking interface 78 is transmitted into prism 76, whereby light from both optics 16 and 18 is directed along common axis 72 in tubular member 56. As may be understood, prisms 74 and 76 and mirror 24 may be so arranged to equalize losses in the optical paths of assemblies 16 and 18. Also, it is necessary that the focal plane of lenses 62 and 64 coincide, wherefore, the length of barrel 68 of assembly 18 is suitably adjusted to compensate for the increased path length between mirror 24 and interface 78.

Figure 4:
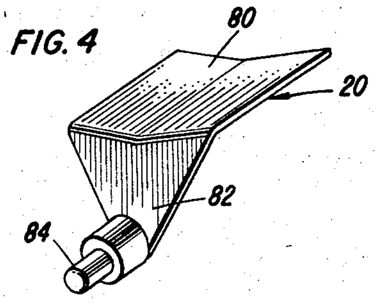
FIGURE 4 shows the shutter mechanism of this invention used in the optical sub-system of FIGURES 2 and 3.

Also included within tubular member 56 are further portions of the invention, viz: shutter mechanism 20 and an appropriate means, such as a rotary or linear solenoid (not shown) to move shutter 20 between the two positions shown in FIGURES 1 and 3. As may be seen in FIGURE 4, shutter 20 comprises an opaque surface 80, and a perpendicular flange 82 at one end thereof. Attached to flange 82 is a short perpendicular shaft 84 which is attached to the solenoid, and by means of which shutter 20 may be pivoted. As previously indicated, surface 80 of shutter 20 is of sufficient size to completely block the passage of light either directly through lens 62, or from the surface of mirror 24, depending upon the position assumed by the shutter.

With further reference to FIGURE 2, and as described in the aforementioned Bogard et al. application (I), there are provided three torque motors 86, 88 and 90, which serve to realign the optical boresight, i.e., the axis 72 of lens 62, in response to signals generated by adaptive controller 48 (FIGURE 1). An output from adaptive controller 48 is provided over lead 92 to the optical system control logic 94 which operates as described below to select both the position of shutter 20, and the signal path for the output of analog-to-digital converter 36.

In order to fully understand the significance of the multiple field of view optics, and the nature and operation of optical system control logic 94, reference is made to FIGURES 5 through 12, discussed below.

Figures 5, 7A, 7B, 7C:
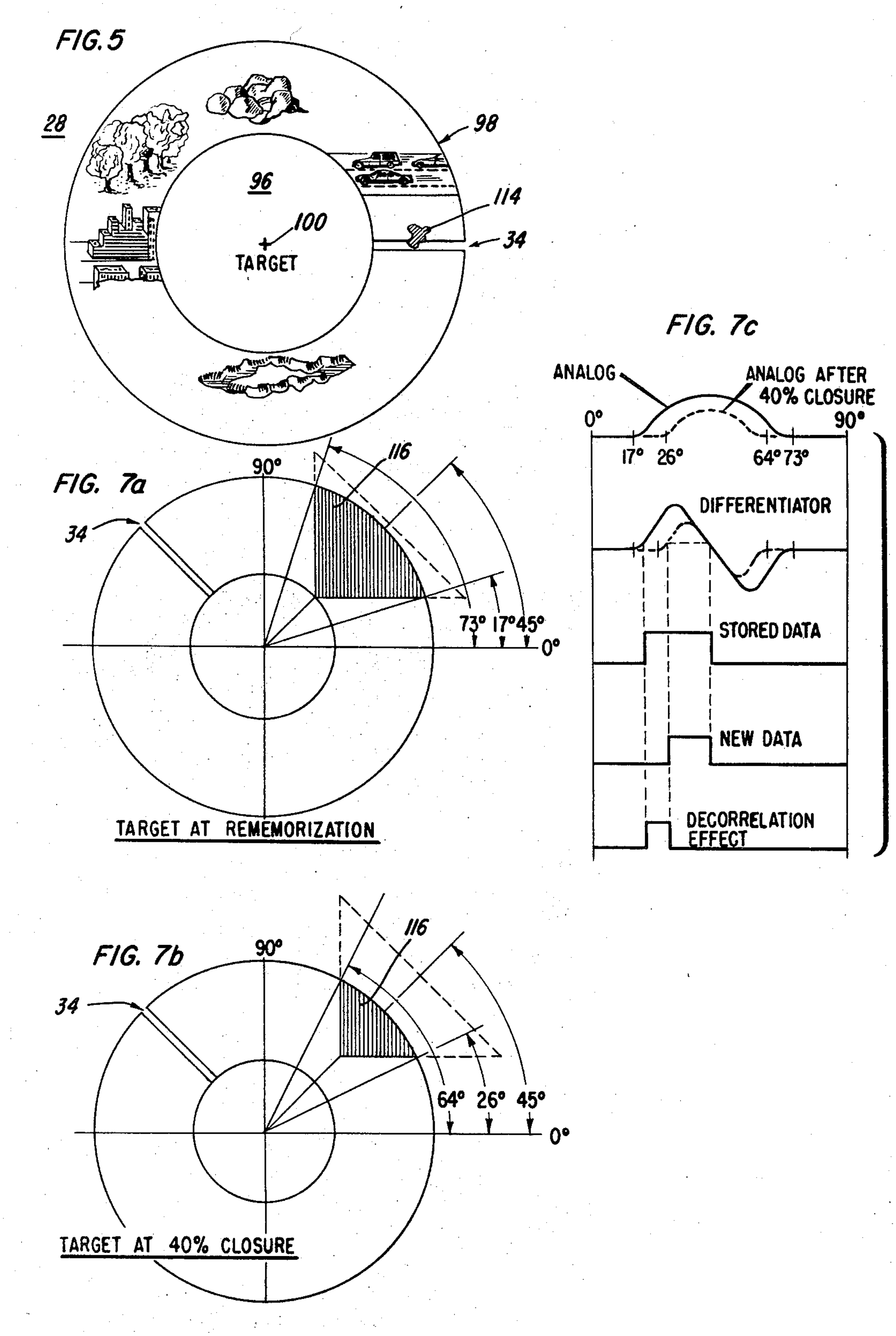
FIGURE 5 shows the nature of the scanning disc of FIGURE 1 and the manner of its operation.

FIGURE 5 depicts the scanning disc 28 used in the correlation guidance system of the present invention. The disc comprises a completely opaque inner portion 96, and an opaque outer portion 98 having therein a generally radial slit 34 arranged to admit light. The disc is positioned at the image plane of the optical system employed and is of appropriate radius to encompass the entire field of view. A target area 100 is normally located in the center of the field of view of the rotating disc 28; in response to the signals generated by the tracker control system 102 shown in FIGURE 1, the optical boresight 72 is maintained such that the target continues to be positioned at the center of the field of view, throughout range closure.

The outer portion 98 of FIGURE 5 represents the area surrounding the actual target, the contrast characteristics of which are measured in the process of guiding the missile. As shown, various objects, both natural and man-made may be found in the vicinity of the target, and in general as disc 28 rotates, such objects will generate an angularly dependent contrast pattern which is sensed by photodetector 32 shown in FIGURE 1 and converted into useful electrical signals.

Figure 6:
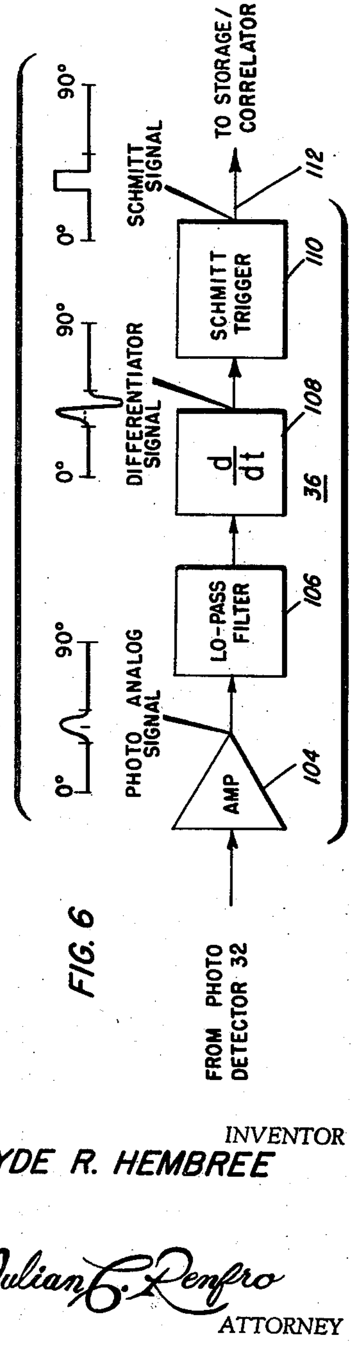
FIGURE 6 is a block diagram showing the construction of the analog-to-digital converter of FIGURE 1, and the nature of the conversion process associated therewith.

In FIGURE 6, there is shown the analog-to-digital converter 36 shown in FIGURE 1, and a number of waveforms appearing at various points in the circuit. Analog-to-digital converter 36 comprises a series connection of an amplifier 104, a low pass filter 106, a differentiator 108, and a Schmitt trigger 110. The output of Schmitt trigger 110 is connected over lead 112 to storage/correlator switch 38, through which it is provided either to memory circuit 40, or directly to correlator 42.

As disc 28 spins, adjacent portions of the shaded area of FIGURE 5 are sequentially observed through slit 34. The changing intensity of the light that passes through the slit is converted into an electrical signal such as that shown at the output of amplifier 104, corresponding to the contrast pattern of an object 114 (see FIGURE 5) within the scanner field of view. This signal is provided to low pass filter 106, the frequency characteristics of which are chosen to pass those components of the photodetector output most useful in the correlation process. The filter output is differentiated, as indicated by the waveform at the output of circuit element 108. Schmitt trigger 110 fires when the amplitude of the derivative signal exceeds a preset threshold, thereby producing a train of output pulses. The duration of each pulse is directly a function of the rate of change of contrast of the target being scanned, and may be used to uniquely characterize the area being scanned by rotating slit 34.

As may be understood, if missile 12, and its desired target maintain precisely the same orientation and distance, the pulse output of Schmitt trigger 110 would be a repeated train of pulses having a repetition period equal to the period of revolution of scanning disc 28.

As the missile approaches the target, the output of Schmitt trigger 110, i.e., the pulse pattern, will vary, both in response to the range closure effects, and also due to variations in the orientations of the tracker relative to the target. Accordingly, if the target scene memorized at the initiation of tracking is correlated with the current output of Schmitt trigger 110, it may be understood that an error signal is generated which signal is provided to adaptive controller 48, in order to provide roll, pitch, and yaw correction signals for the tracker.

As indicated, correlation between the memorized and current patterns is affected both by variations in orientation, and by range closure. In FIGURES 7*a* through 7*c*, 8*a* through 8*c* and 9, are shown the various effects on the correlation between data memorized at a given range and that currently obtained after the missile has approached the target, i.e., at 40% range closure.

In FIGURES 7*a* through 7*c*, is shown the effect caused by radial movement of points of contrast out of the scanner field of view. FIGURE 7*a*, includes a wedge shaped dark point of contrast 116, situated between scanner angles of 17 and 73 degrees, the zero reference being arbitrarily taken as shown.

In FIGURE 7*b* is shown the same point of contrast 116. However, due to approach of the missile to the target, the apparent radial distance between the point of contrast and the system boresight will have increased, causing it to appear as shown in FIGURE 7*b*. Here, it may be seen that the point of contrast present only between scanner angles of 26 and 64 degrees, rather than between 17 and 73 degrees as was the case for the greater range shown in FIGURE 7*a*. The decorrelation effect of such apparent radial motion is shown in FIGURE 7*c*, where the solid lines represent the initial photodetector output, and its derivative, and the dotted lines represents the detector output and its derivatives at the shorter range. The wave form labeled "stored data" in FIGURE 7*c* is the output of A/D converter 36, stored in the memory at the time that the target appeared as shown in FIGURE 7*a*, while the waveform labeled "new data" represents the digitized contrast pattern at the range shown in FIGURE 7*b*. The difference between the stored and current data may be seen in the waveform labeled "decorrelation effect." From the above discussion, it may be seen that the outward motion of a dark point of contrast effectively causes a phase delay between the current contrast data, and previously stored data. As may be understood, similar radial motion of a light point of contrast of similar configuration would cause instead a phase advance between the current and stored data. Such phase advance shifts the tracker aimpoint and would cause range closure error.

In FIGURES 8*a* through 8*c*, is shown the converse situation to that of FIGURES 7*a* through 7*c*, namely the apparent radial motion of a dark, wedge-shaped point of contrast 118 as it enters the field of view of the scanner, i.e. as it enters the annular outer portion 98 of FIGURE 5. As may be seen, the decorrelation effects due to such entry of points of contrast into the field of view are similar to those occurring as points of contrast leave the field of view. However, comparison shows that the dark light decorrelation relationships are reversed. As shown in FIGURES 8*a* through 8*c*, entry into the field of view of the dark point of contrast 118, causes a phase advance between the current and the stored data, while entry of a light point of contrast causes a converse phase lag.

In FIGURE 9 is shown the decorrelation effects caused by apparent variation in the position of the horizon as the missile approaches the target, i.e. "horizon effect." As shown, the area within the missile field of view is generally composed of both a sky portion 120 and ground surface portion 122, two highly contrastive regions divided by the horizon 124. Dividing line 124 could also be a land-water boundary, or a boundary between two fields, i.e., any line between two large areas of substantially different contrast. The outer edge of the initial field of view of the tracker is represented by circle 126. At some later time, after the target range has been decreased, the outer edge of the tracker field of view is denoted by circle 128. At the range represented by circle 126 as the scanner slit passes between angles $a_1$ and $a_2$, at least a portion of the slit is viewing the sky. For angles less than $a_1$, and greater than $a_2$, the field of view encompasses the earth only.

At a later point in the flight, when the field of view is represented by circle 128 it may be seen that sky will be viewed during a smaller portion of the scanner cycle i.e., between scanner angles $b_1$ and $b_2$. If the system memory is loaded when the field of view is represented by circle 126, and such information is compared with current information obtained when the field of view is shown by circle 128, it may be seen that there will be a substantial decorrelation effect, the magnitude of which will depend upon the change in the angle at which the horizon is first viewed during the scan, i.e., angle $b_1-a_1$. In response to such decorrelation, signals generated by adaptive controller 48 will attempt to reorient the system boresight such that the scanner angle at which the sky first appears is again approximately $a_1$. In order to accomplish this, the system boresight would in effect have to be moved to the point labeled B in FIGURE 9. This of course would be erroneous, and it may be understood, that such error will continue to increase as the missile approaches the target, unless the reference pattern is rememorized. All terrain features which posses long edges will cause this effect and degrade tracking accuracy.

In FIGURE 10, is shown the effect of a straight-forward approach to correction of range closure effects, namely periodic rememorization of the information stored in the system memory. Thus, at successive arbitrarily chosen points $R_0$, $R_1$, etc., in the missile path, the system is directed to establish in the memory, information represented by the contrast pattern current at that time. However, as may be seen from FIGURE 10, at each such rememorization, errors which had been previously accumulated are of necessity retained, which errors are never removed. This error can not conveniently be compensated for by previously available techniques.

In FIGURE 11, is shown an optical diagram indicating the advantages that can be obtained by employing a variable field of view, i.e. variable focal length system. For example, if the missile is situated at range $R_0$, it may be seen that the field of view of an optical system having a long focal length will intersect the surface 130 of the target at points 132 and 134. On the other hand, the field of view of an optical system having a shorter focal length will intersect target 130 at points 136 and 138.

At some closer range $R_1$, determined by the ratio of the focal lengths of the two optical systems, it may be seen that the large field of view will coincide with the original smaller field of view and both will intersect the target surface at approximately the points 132 and 134 thereby producing equal images (and corresponding contrast patterns) between large field of view optics and the memorized image taken with small field of view optics at the greater range $R_0$.

Accordingly, if the small field of view optics 18 is used to produce the image whose contrast pattern is initially stored in memory 40, and continues to be used during range closure until the decorrelation errors caused by such range closure reaches an unsatisfactorily high degree, then the large field of view optics 16 is placed in operation and used to collect current target information at least until the missile reaches the range $R_1$ as shown in FIGURE 11, then correlation errors due to range closure will be minimized, because the actual image size represented by the stored contrast pattern is the same as that represented by the current contrast pattern. At his point (which would correspond to a correlation error in FIGURE 10 such as that present in the vicinity of range $R_0$) the memory may be updated, without the accumulation of a series of correlation errors which might otherwise result.

Thus, with the system shown in FIGURES 1 through 3, a pair of lenses of different focal lengths, i.e. having different fiields of view, may be alternately used to view the target, and to provide either current data for use directly by correlator 42 or for storage in memory 40 at the required rememorization times.

In order to determine the appropriate level of correlation at which to switch between opties 16 and 18 shown in FIGURE 1, a novel optical system control logic unit 94 is used to measure the correlation betwen the current and stored data, and to provide switching functions in accordance therewith. A basic approach to the construction of logic unit 94 is shown in FIGURE 12, along with other portions of the system of FIGURE 1 including storage/correlation switch 38, memory 40, correlator 42, and adaptive controller 48. The circuitry shown in FIGURE 12 includes storage/correlation switch 38 comprised of an inhibit gate 140, and a coincidence gate 142 operated simultaneously by a signal appearing on lead 144 from a delay multivibrator 146 described below. Coincidence gate 142 is connected to memory unit 40, which, as previously indicated, preferably comprises a rotating magnetic disc operating in synchronism with scanning disc 28. The output of inhibit gate 140 is directly connected to correlator 42, as is the output of memory 40. As mentioned in the above-described Bogard et al. application (I), the particular correlator used may be of any suitable type, e.g., that described in copending United States patent application Ser. No. 509,993, filed Nov. 26, 1965 by G. L. Harmon, entitled "Binary Phase Comparator" and assigned to the assignee of the present invention. A correlator according to the Harmon application provides for a digital phase comparison and provides a pair of positive output signals over leads 44 and 46 representative of the apparent degree of angular misalignment between the stored contrast pattern and that currently viewed by the scanner. As taught by the Bogard et al. application (I), the energy in the correlator output signal has been found to be relatable to the angular misalignment between the patterns, however, in order that the appropriate relationships exist, it is necessary that the range closure effects described above not be present or be compensated for.

The relationship between the correlation energy and the angular misalignment is exploited by means of adaptive controller 48 including means 148 to compare the correlation energy with a correlation signal based on arbitrarily assumed values of anticipated angular misalignment (pitch, roll, and yaw) stored in a suitable memory 152, and logic circuitry 150 to adjust the assumed values of error on the basis of the comparison between the actual and assumed correlation signals whereby the assumed values are caused to converge to the true values. In the presence of noise, a "least squares fit" is made to provide statistically optimum estimates of the pitch, roll, and yaw errors. According to the present invention, it has been found that due to range closure effects, it is never possible to completely correlate the current scanned pattern with that previously stored. This inability to achieve complete correlation manifests itself as a non-zero component in the output of comparator 148 of adaptive controller 48. In general, as the time since the most recent rememorization increases, the typical magnitudes of the individual signals at the output of comparator 148 also increase, and eventually reach magnitudes such that accurate correlation information is no longer available.

By measurement and appropriate reaction to the residual energy present in the output of comparator 148, the novel control logic 94 of this invention provides switching and rememorization command signals for the system. Control logic 94 includes an absolute value integrating circuit 154, including a capacitive input 156, a pair of steering diodes 158 and 160, and an inverting circuit 162 connected to the output of one of the diodes, e.g., 158. The output of the other diode 160 and the inverter circuit 162 are connected to an integrator 164, which may comprise an operational amplifier having capacitive feedback. Integrator 164 provides a summation of the average of the absolute values of the residual energy appearing at the output of comparator 148, over a short time interval. This summation signal is connected to a variable threshold trigger circuit 166, which serves as a level detector. The operating level of trigger circuit 166 is adjusted in accordance with the degree of correlation error which can be tolerated before system performance is degraded. The output of variable threshold trigger 166 is connected as a triggering input to a flip-flop 168 which provides complementary outputs on leads 170 and 172, the level of which outputs switches each time that the variable threshold of trigger 166 is exceeded.

The signal appearing on lead 170 is connected to shutter mechanism 22 (see FIGURE 1) and serves to reverse the position of shutter 20, each time that the degree of correlation provided by the then operating lens reaches an unsatisfactory level. A low level on lead 170 serves to switch shutter 20 into the position shown in FIGURE 1, whereby to block the light collected by optics 16. Conversely, a high signal level on lead 170 causes shutter 20 to switch to the position shown in outline in FIGURE 1 thereby permitting light to pass through optics 16 and blocking light from optics 18.

The ZERO output of flip-flop 168 on lead 172 is connected to a rate circuit 174 and delay multivibrator 146 which has a period exactly equal to the period of rotation of scanning disc 34. As previously noted, the output of delay multivibrator 146 is connected to inhibit gate 140 and coincidence gate 142 in storage/correlation switch 38. Thus, each time a signal is provided to block optics 16, the delay multivibrator 146 responds to the leading edge thereof to block the signal provided to correlator 42, and to initiate the storage in memory 40 of the then current contrast pattern received by scanner 14. As may be understood, by appropriate selection of the threshold for trigger circuit 166, rememorization can be made to occur when the decorrelation energy reaches any appropriate value, therefore, it may be seen that accumulation of errors such as in the case of FIGURE 10 may be avoided.

In the operation of the system of FIGURE 12, under normal circumstances, the system operates with the shutter in the position shown. Thus the small field of view (long focal length) optics 18 passes light to mirrors 24 and 26 and through rotating disc 28 to photodetector 32. At the time of missile launch, or whenever the initial storage of information in memory 40 is desired, a suitable signal may be provided to establish flip-flop 168 in the ZERO state, i.e., a low level appearing on lead 170 to block optics 16. The appearance of this signal causes a pulse through differentiating circuit 174 which in turn operates delay multivibrator 146 to permit exactly one cycle of information to pass through coincidence gate 142 and to be stored in memory 40. After delay multivibrator 146 returns to its rest state, information provided by A/D converter 38 passes through now reactivated inhibit gate 140 to correlator 42. At the same time, however, the output of memory 40 is also provided to correlator 42 and the correlation signals appearing on leads 44 and 46 serve to control tracker 14 as previously described. Initially, of course, the long focal length optics 18 provides both the current and the stored data. However, as the missile approaches the target, and the range closure effects begin to cause substantial decorrelation energy at the output of comparator 148, the threshold level of circuit 166 is exceeded, and flip-flop 168 is switched into its ONE state. At this time shutter 20 is reversed and light produced by optics 16 is permitted to pass through mirror 26 to scanning disc 28, and thence to photodetector 32. However, since, differentiator 174 responds only to positive-going signals, no change occurs at this time in the state of gates 140 and 142 in storage/correlation switch 38.

The field of view of optics 16 is sufficiently larger than that of optics 18 and the range at which it is put into operation is so chosen that the image it produces is slightly smaller than the image produced by the long focal length optics 18 at the time of storage. This assures that positive tracking will be regained after the transition between the two lenses. The return to small field-of-view and rememorization action results in a short period of time during which the guidance system "coasts," although the effect of this may be ignored in most situations.

After the shutter has changed position, and the missile has approached the target by a sufficient distance to permit the image of the shorter focal length lens to have grown to correspond to the image stored in memory, positive tracking under control of correlator 42 is resumed.

As the missile continues to approach the target, there again results a situation where range closure effects cause substantial changes in image size, and corresponding decorrelation between the originally stored image and that currently being received. It should be pointed out that the present system has been shown incorporating only a pair of lenses 62 and 64. However, the principles described above apply directly to a system having a greater number of lenses each with successively shorter focal lengths. With such an arrangement, as correlation between the originally stored image (produced by a long focal length lens) and the currently scanned image (produced by successively shorter and shorter focal length lenses) becomes unsatisfactory, an even shorter focal length lens may be "switched in" to decrease to any desired degree the frequency with which the information in memory 40 must be updated.

Once all of the available lenses have been used, it becomes necessary to update the information in memory 40 (again using the longest possible focal length lens) in order to achieve the maximum benefits from the multiple field of view system. Thus, referring again to FIGURE 12, once flip-flop 168 returns to the ZERO state, an appropriately timed signal is again provided to enable coincidence gate 142 and to block inhibit gate 140 thereby permitting the information to be stored in memory 40. In regard to the use of a number of lenses greater than two, it may be understood that under such circumstances, flip-flop 168 would be replaced with a multistate counter and the simple rotary solenoid mechanism replaced by an apropriate device to successively block all of the lenses except that in use at the particular time. Such an arrangement could include appropriate rotating mirrors, shutters, and the like as will be obvious to one skilled in the art in view of the above discussion.

In FIGURE 13 there is shown a practical embodiment of logic circuit 94 shown in FIGURE 12. The basic arrangement of the circuit of FIGURE 12 is preserved. However, pitch and yaw inhibit circuits have been added to prevent the triggering of flip-flop 168 if the pitch or yaw errors are above preset thresholds. The circuit includes three identical absolute energy integrators 154, 176 and 178, such as shown in FIGURE 12 and corresponding variable threshold trigger circuits 166, 180 and 182. Integrator 154 is connected through capacitor 156 to the output of comparator 148 as in the case of FIGURE 12, while integrators 176 and 178 are connected directly to the pitch and yaw outputs of adaptive controller 48, shown in FIGURE 1. The outputs of all of Schmitt triggers 166, 180 and 182 are connected to a suitable gate 184 having one enabling input 186 and two inhibit inputs 188 and 190, connected as shown. The output of gate 184 is connected as a first input to an OR gate 187 which in turn drives the trigger input or flip-flop 168. Thus it may be seen that if a substantial angular misalignment exists as determined by adaptive controller 48 so that an output is present from Schmitt trigger 166, and flip-flop 168 is prevented from switching by the absence of an input signal, whereby, during the time that the vehicle is executing a correction in its flight path, rememorization cannot occur, thereby further preventing the accumulation of random and uncontrollable errors in the memorized signal. Additional inhibit signals may be provided if desired to prevent switching at anytime servos in the system are not balanced, if the missile is travelling through clouds, or at any other time that switching might result in the accumulation of errors.

Furthermore, to make the system fail-safe, a simple binary counter 191 may also be added to furnish an override rememorization command. The counter is enabled when trigger circuit 166 is fired in response to the exceeding of a satisfactory decorrelation level. As long as the output of trigger circuit 166 is present, a coincidence gate 192 is enabled, whereby clock signals provided by rotating memory 40 are successively counted by means of binary counter 191. After the receipt of a sufficient number of counts, an override command signal is provided by a decoder 194 and provides the second input to OR gate 187 thereby permitting the reversal of flip-flop 168 notwithstanding high levels of pitch or yaw error. The output of OR gate 187 is provided to a monostable multivibrator 196, which serves to reset binary counter 191 each time a change in the state of flip-flop 168 occurs, irrespective of the origin of the command.

As previously noted, during the time that operation is switching between optics 16 and 18, there exists a period during which the optical guidance system "coasts" and the system must proceed without guidance. If this should prove undesirable, the system can be modified as explained in connection with FIGS. 14 and 15. Alternatively, gyro stabilization of the pitch, yaw, roll gimbals can eliminate errors during rememorization as explained in detail in the above-mentioned Bogard et al application (II).

In FIGURE 14 is shown a diagram representative of the decorrelation due to range closure between initial images produced by both large and small fields of view lenses, and current images produced only by the large field of view lens. In the figure, curve 198 represents the correlation between the current large field of view data and initially stored small field of view between initially stored small field of view data and current small field of view data. As may be seen, for an initial $R_0$, correlation is best between the data acquired with the same lens, i.e., curve 200. However, as the missile approaches the target decorrelation errors rapidly increase, Conversely, at large ranges the correlation resulting from use of the two lenses, namely, curve 198, produces extremely large errors which decrease rapidly as the missile approaches the target. However, beyond a certain range, $R_2$ determined by the ratio of the fields of view, the correlation represented by curve 198 begins to be degraded, as the size of the stored image and that currently produced begin to diverge. However, as shown in FIGURE 14 there is a range $R_1$ at which curves 198 and 200 intersect. According to the modified embodiment of this invention, between ranges $R_0$ and $R_1$, correlation guidance is achieved by providing current data that would produce the correlation shown in curve 200, while between ranges $R_1$ and $R_2$ data is provided by the lens which would produce the correlation shown by curve 198. At the minimum point of curve 198, the correlation error has been reduced to the minimum possible value, and that point represents the optimum point for the updating of the information in memory 40.

It should be noted that the point $R_1$ represents the optimum point at which switching between lenses should be effected in the embodiments previously described. It is not necessary to switch at a slightly larger range (than $R_1$) because the decaying trend of curve 198 is sufficient information to let the large field of view take command.

The configuration of FIGURE 15 is quite similar to that shown in FIGURE 12. However, it includes a modified storage/correlation switch 38', a modified memory 40', a modified correlator 42', and a modified optical system control logic unit 94'. In addition, it includes a comparator circuit 202, and a memory selection switch 204.

Storage/correlation switch 38' is generally similar to corresponding switch 38, however it provides, in addition to a direct output to correlator 42', a pair of outputs to a corresponding pair of memory sections 206 and 208 which comprise modified memory 40'. Each of memories 206 and 208 are connected to a corresponding portion 210 and 212 respectively of correlator 42'.

Each of correlators 210 and 212 are connected to comparator 202, and also to memory selection switch 204. The output of memory selection switch 204 is directly connected to a data processing portion of adaptive controller 48 and provides correlation energy thereto in the same manner that correlation energy is provided in the circuit of FIGURE 12.

Comparator 202 serves to supply a signal over lead 216 whenever the outputs of correlators 210 and 212 are equal.

Control logic unit 94' is connected to shutter mechanism 22 as described above, to storage/correlation switch 38', and to memory select switch 204. A second input to control logic 94' is provided over lead 214 from adaptive controller 48 and corresponds to the output provided from comparator 148 shown in FIGURE 12.

In operation, when the initial memorization of the data is required, logic unit 94' first positions shutter mechanism 22 to block short focal length optics 16. Simultaneously, a signal is provided to switch 38' to permit the passage of a signal therethrough to one of the memory circuits, for example memory 206. Memory 208 is blocked at this time. After a complete rotation of scanning disc 28, shutter mechanism 22 and switch 38' are reversed, causing the storage in memory 208 of the image produced by short focal length optics 16. Shutter mechanism 22 remains in this position and data continues to be acquired by means of the short focal length (large field of view) lens.

Concurrently with the above, a signal is provided by optical control logic 94' to switch 204, whereby the output of correlator 212 (which output would correspond to curve 200 in FIGURE 14) is provided to adaptive controller 48. Thus, initial operation of the guidance system results in correlation between information stored by the short focal length lens, and current information produced by the same lens.

The output of correlators 210 and 212 are connected to comparator circuit 202 which provides a signal when the two correlations are equal. In FIGURE 14, this corresponds to $R_1$, i.e. the intersection of curves 198 and 200. At this point, a signal is provided to control logic 94' and a signal which generates a switching signal by which memory selection switch 204 is reversed, to permit the output of correlator 210 to feed adaptive controller 48. From this point until the missile reaches range $R_2$, the correlation continues to improve as the image originally produced by the long focal length lens becomes more and more nearly equal to that currently being provided by the short focal length lens. Since the two correlation signals are exactly equal at range $R_1$, the chance of improper switch to large field of view is decreased, as possible in the previously described embodiment.

Referring again to FIGURE 14, it may be seen that at point $R_2$, curve 198 reverses and the error begins to increase. At this point, therefore, memory 40' is updated, and the process is repeated. This is accomplished by the provision of signals to reverse shutter 20, and to reset switches 38' and 204. The missile then proceeds as described above until further rememorization is necessary.

As may be seen from the above, the provision of a system having multiple fixed fields of view provides a number of highly advantageous results. It should be emphasized that manner of providing the multiple fields of view may be varied considerably within the scope of the invention. Similarly variations in the circuitry may also be made without departure from the invention.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. In a tracker for determining angular misalignment between the actual aim point of a missile and a desired aim point including acquisition means to provide an indication of the appearance of the tracker field of view, memory means connectable to the acquisition means to record the indication, and means to compare the stored indication with an indication of the current appearance of the tracker field of view, and to generate a signal indicative of the difference, and missile and tracker control means responsive to the difference signal to control the course of the missile; the acquisition means comprising a multiple field of view optical system, control means for altering the field of view of the optical system, and circuit means responsive to the difference signal to operate the control means and selectively to effect the storage in the memory means of a signal representative of the current appearance of the tracker field of view, said optical system comprising a plurality of lenses, each having a different focal length, the optical axes of all of the lenses being positionable substantially toward the current tracker aim point, photodetector means, means to direct light passing through a lens from the current tracker aim point toward the photodetector, and where the control means comprises means selectively operable to permit light from only one of the lenses at a time to reach the photodetector, said last named means comprising shutter means positionable in the light path of each lens to completely block light therefrom, and actuator means connected to the circuit means and responsive to signals therefrom for removing the shutter means from the light path of one of the lenses to permit light to pass therethrough to the photodetector, said circuit means comprising first means to generate a signal representing the summation of the average of the absolute value of the energy in the difference signal, level detection means connected to the first means to generate a trigger signal whenever the output of the first means exceeds a predetermined level, a plural state selection circuit having a number of output states equal to the number of lenses in the optical system, the plural state circuit being connected to the level detector and responsive to successive trigger signals to energize successive output states, the actuator means being responsive to the various output states to permit the passage of light through the correponding lens to the photodetector means and first gating means responsive to a particular output state for connecting the photodetector means to the memory means thereby to effect a storage in the memory means of an indication of the current appearance of the tracker aim point.

2. The apparatus of claim 1 including means connected to the level detector and responsive to externally generated signals for inhibiting the passage of the trigger signal to the selection circuit.

3. The apparatus as set forth in claim 2 including further means responsive to the trigger signal to override the externally generated signals after a predetermined period of time has elapsed.

4. In a tracker for determining angular misalignment between the actual aim point of a missile and a desired aim point including acquisition means to provide an indication of the appearance of the tracker field of view, memory means conectable to the acquisition means to record the indication, and means to compare the stored indication with an indication of the current appearance of the tracker field of view, and to generate a signal indicative of the difference, and missile and tracker control means responsive to the difference signal to control the course of the missile; the acquisition means comprising a multiple field of view optical system, control means for altering the field of view of the optical system, and circuit means responsive to the difference signal to operate the control means and selectively to effect the storage in the memory means of the signal representative of the current appearance of the tracker field of view, said circuit means comprising first means to generate a signal representing the summation of the average of the absolute value of the energy in the difference signal, level detection means conected to the first means to generate a trigger signal whenever the output of the first means exceeds a predetermined level, a selection circuit providing an output corresponding to the various fields of view of the optical system, the selection circuit being conected to the level detector and responsive to successive trigger signals to adjust the output to correspond to a particular field of view, means responsive to changes in the output of the selection circuit for connecting the acquisition means to the memory means thereby to effect a storage in the memory means of an indication of the current appearance of the tracker aim point.

5. The apparatus of claim 4 including means connecting the level detector to the selection circuit and responsive to externally generated signals for inhibiting the passage of the trigger signal to the selection circuit, and further means responsive to the trigger signal to override the externally generated signals after a predetermined period of time has elapsed to permit switching of the selection circuit.

6. The apparatus as set forth in claim 1 where the memory means comprises a plurality of portions equal in number to the number of lenses, selectively connectable through the first gating means to the photodetector means, where the means to compare the stored indication with the current indication comprises a plurality of portions connected respectively to one of the memory portions, and through the first gating means to the photodetector means whereby a plurality of difference signals are generated, and where the circuit means includes means to compare a first one of the difference signals with successive difference signals and to generate a switching signal when the signals being compared are equal, second gating means for selectively providing one of the difference signals to the missile and tracker control means, and logic means responsive to trigger signa's and switching signals to operate the first and second gating means.

7. The apparatus of claim 6 where the optical system includes two lenses of different focal lengths, where the shutter mechanism is normally positioned to prevent light from the long focal length lens from reaching the photodetector means, and where the difference signal corresponding to the second of the memory portions is normally connected to the missile and tracker control means.

8. The apparatus of claim 7 where the logic means is responsive to a first trigger signal to block the short focal length lens and to operate the first gating means to connect the photodetector means to the first portion of the memory means, then to block the long focal length lens and to operate the first gating means to connect the photodetector means to the second portion of the memory means, then to operate the first gating means to connect the photodetector means to the first and second comparator portions, and responsive to a switching signal to operate the second gating means to connect the first difference signal to the missile and tracker control means.

9. An optical tracker for determining angular misalignment between an actual aim point and a desired aim point of the system optics comprising:

(a) acquisition means to provide an indication of the appearance of the tracker field of view, said acquisition means including a multiple field of view optical system;

(b) memory means connectable to said acquisition means to record the indication;

(c) means to compare the stored indication with an indication of the current appearance of the tracker field of view and to generate a signal indicative of the difference;

(d) circuit means to generate a derivation of the difference signal, said derivation being proportional to any change of the difference signal;

(e) level detection means to generate a signal whenever the output of the difference signal derivation exceeds a predetermined level;

(f) selection circuit means connected to the level detection means to cause the selection circuit output to correspond to a particular field of view; and (g) control means for switching between the fields of view of the optical system, said control system being responsive to changes in the output of said selection circuit means, thereby connecting the acquisition means to the memory means to effect a storage in the memory means of an indication of the current appearance of the tracker aim point.

10. An optical tracker for determining angular misalignment between an actual aim point and a desired aim point of the system optics, comprising acquisition means to provide an indication of the appearance of the tracker field of view, memory means connectable to said acquisition means to record the indication, means to compare the stored indication with an indication of the current appearance of the tracker field of view and to generate a signal indicative of the difference, circuit means to generate a derivation of the difference signal, said derivation being proportional to any change of the difference signal, logic means for generating an output signal whenever the output of the difference signal derivation exceeds a predetermined level, selection circuit means connected to said logic means for causing in response to its output signal, the selection circuit output to correspond to a particular field of view, and control means responsive to changes in the output of said selection circuit means, thereby connecting said acquisition means to said memory means to effect a storage in the memory means of an indication of the current appearance of the tracker aim point.

References Cited

UNITED STATES PATENTS

| | | | |
|---|---|---|---|
| 2,120,654 | 6/1938 | Spence et al. | 350—266 |
| 2,427,256 | 9/1947 | Butscher | 343—5 |
| 2,492,353 | 12/1949 | Brackett | 350—31 |
| 2,884,540 | 4/1959 | Shockley | 244—3.16 |
| 3,023,318 | 2/1962 | Jones | 350—269 |
| 3,244,060 | 4/1966 | Zuckerbraun | 350—269 |

BENJAMIN A. BORCHELT, *Primary Examiner.*

T. H. WEBB, *Assistant Examiner.*